United States Patent Office 3,287,446
Patented Nov. 22, 1966

3,287,446
HIGHLY TRANSPARENT COMPOSITE FILM COMPRISING DIFFERING VINYLIDENE CHLORIDE COPOLYMERS
Walter T. Koch, Drexel Hill, Pa., assignor, by mesne assignments, to FMC Corporation, San Jose, Calif., a corporation of Delaware
No Drawing. Filed Apr. 17, 1963, Ser. No. 273,576
9 Claims. (Cl. 260—898)

This invention relates to a highly transparent composite film and method of preparing the same.

The clarity of organic films having high transparency, for example, cellophane may be degraded by coating compositions which contain clays and waxes as slip improvers. The use of clay, in particular, reduces the clarity of the composite film to a degree which is readily discernible by the eye. A material which has the favorable properties of clay but which is compatible with the coating composition and does not noticeably affect the clarity of the coated film is desired.

The primary object of this invention is to provide a highly transparent composite film having good slip characteristics.

Another object of this invention is to provide a composite film wherein the excellent clarity of an organic base film is not impaired by the moistureproof coating composition employed.

A further object of this invention is to provide a convenient and inexpensive method of preparing a coating composition for a clear base film which will not degrade the clarity of the base film but which will provide the necessary characteristics for commercial packaging operations.

These and other objects are accomplished in accordance with this invention by a composite film comprising a clear, nonfibrous organic base film, and a solvent laid coating on at least one side thereof comprising a major proportion of a resinous copolymer of from 75 to less than 92% by weight of vinylidene chloride and at least one other monomer copolymerizable therewith, and from about 0.2 to about 2% based on the weight of the coating of solid particles having a size of from 0.1 to about 5 microns of a resinous copolymer of at least 92% and up to 99% by weight of vinylidene chloride and at least one other monomer copolymerizable therewith.

The invention also includes the method of preparing a coating composition for clear films comprising copolymerizing from about 92 to about 99% by weight of vinylidene chloride and at least one other monomer copolymerizable therewith by aqueous emulsion polymerization, drying the emulsion polymerization mixture, and introducing the dried residue of the emulsion polymerization into a coating lacquer which contains as the film-forming ingredient a copolymer of from about 75 to less than about 92% by weight of vinylidene chloride and at least one other monomer polymerizable therewith, said residue incorporated in said lacquer in an amount of from about 0.2 to 2% based on the weight of the coating composition.

The lacquer prepared as described above is applied to a clear, non-fibrous organic base film. The organic film is suitably a cellulosic film including regenerated cellulose, hydroxyalkyl cellulose ether, alkyl cellulose, cellulose esters, e.g., cellulose acetate, cellulose nitrate; synthetic resin polymer films including polyolefins, polyesters, etc. The preferred film of this invention is regenerated cellulose.

The lacquers used for this invention are well known and contain from about 5 to about 40% by weight solids, i.e., residue after solvent removal, and an organic solvent or solvent-diluent mixture. The solvents and/or diluents include, for example, tetrahydrofuran, methyl ethyl ketone, ethyl acetate, butyl acetate, acetone, ethyl alcohol, butyl alcohol, ether-alcohols, e.g. Cellosolves; heptane, benzene, toluene, xylene, etc.

The resinous copolymers which are dissolved in the lacquer solvents are prepared in any known manner, usually by emulsion polymerization. The copolymer of 75 and less than about 92% by weight of vinylidene chloride and at least another monomer are soluble in the lacquer solvent or solvent-diluent combination.

Monomers which are copolymerizable with vinylidene chloride include for example, acrylonitrile, acrylamide, vinyl chloride, vinyl acetate, ethyl acrylate, butyl acrylate, ethylhexyl acrylate, methyl methacrylate, ethyl methacrylate, ethylhexyl methacrylate, stearyl methacrylate, acrylic acid, methacrylic acid, itaconic acid, etc. These monomers or combinations thereof may be copolymerized with vinylidene chloride when the latter is present in any amount from 75 up to 99% by weight.

Additives to improve the film characteristics may also be included in the coating lacquer as long as they do not degrade the desirable characteristics of the composite film.

The emulsion polymerization of the 92 to 99% vinylidene chloride copolymer is carried out using known techniques. For example, the polymerization is conducted in an aqueous system containing the monomers to be copolymerized, an initiator and activator, e.g., ammonium persulfate and meta-sodium bisulfate, and a dispersing agent including sodium lauryl sulfate or sodium tetradecyl sulfate. The mixture is refluxed and, upon completion of the refluxing, polymerization is complete. Thereafter, the mixture may be stabilized by the addition of more organic salt, if desired.

The emulsion polymerization mixture is dried, usually in air, to recover the finely-divided copolymer which, in the emulsion, ranges in particle size from about 0.01 to about 1 micron. Spray drying techniques are useful to retain other dispersed ingredients of the emulsion polymerization system. In general, such techniques involve the spraying of the aqueous dispersion through high speed dry, heated air streams which quickly remove the moisture therefrom. The residue of the emulsion polymerization may advantageously be incorporated in an organic non-solvent liquid to prepare a paste by ball-milling or the like. The paste, containing resin particles ranging in size from about 0.1 to 5 microns is then easily incorporated and distributed in the coating lacquer. Non-solvent organic liquids for the particulate resin include, for example, the solvents used for the coating lacquer.

Aside from the obvious advantage of not having to remove other ingredients of the emulsion polymerization system, these materials, i.e., emulsifier and salts, improve the rate at which any surface electric charge on the coated film decays thus aiding operation on packaging machinery. In addition any wetting agent retained helps printing with e.g., monosolvent polyamide inks.

The resinous copolymer of at least 92% by weight of vinylidene chloride is substantially insoluble in the solvent used to dissolve the coating copolymer. The particulate resin is added to the coating lacquer in an amount which improves the slip rating of the coated film but in an amount which does not degrade the clarity of the film to the extent that an equal additive amount of a clay or clay-wax combination slip agent. In general, the amount of particulate resin from the dried emulsion polymerization system added to the lacquer ranges from 0.2 up to 2% based on the weight of the coating composition, preferably in an amount of from about 0.5 to about 1.5% depending on the particular copolymer employed.

The following is set forth to demonstrate this invention:

Copolymers of over 92% by weight of vinylidene chloride and a remainder of acrylonitrile were prepared by emulsion polymerization. The aqueous copolymer dispersions of 35% solids were adjusted to pH 6.0 with ammonium hydroxide, placed in shallow trays and left overnight to dry at room temperature. The material dried to a white solid which was readily reduced to a fine powder. Butyl acetate was added to the solid residue of the drying step and the mixture ball-milled to produce a smooth paste of about 40% solids content having a particle size range from 0.1 to 5 microns. The paste was then added to a stock vinylidene chloride copolymer coating lacquer in varying additive amounts and the resulting lacquers applied to 0.9 mil thick anchor-coated regenerated cellulose films. The stock lacquer comprised 84.8% by weight of a solvent consisting of 65 parts tetrahydrofuran and 35 parts toluene, 15% by weight of a copolymer of 90% by weight of vinylidene chloride and 10% by weight of acrylonitrile, 0.35% by weight of hydrogenated castor oil, and 0.04% by weight of a liquid resinous interpolymer of phthalic anhydride, adipic acid and diethylene glycol in castor oil carrier.

The following table shows the test results obtained with composite films of this invention and corresponding films using clay slip agents.

TABLE

| Additive | Amount | Haze No. | Tack | Heat Seal, g./2 in. | Blocking |
|---|---|---|---|---|---|
| None | | 1.0 | Slight | 637 | 3 |
| Copolymer, 93.5% VCl₂¹ | 1.2 | 0.9 | None | 674 | 1 |
| Copolymer, 93.5% VCl₂¹ | 0.6 | 1.2 | ---do--- | 551 | 1 |
| Clay² | 0.2 | | | | |
| Do | 0.8 | 3.6 | ---do--- | 577 | 1 |
| Copolymer 97.5% VCl₂¹ | 0.6 | 3.0 | ---do--- | 627 | 1 |

¹ Vinylidene chloride.
² Clay dispersion of 40% solids in butyl acetate.

In the above table, the Haze No. represents the degree of clarity of the film. The Haze No. is a measure of the amount of light transmitted through film. The lower the number the more light that passes through. In the manufacture of these films an overlay spray is used to improve "push feed." This overlay reduces clarity and any means to improve the clarity to make up for the reduction thereof from this treatment is desirable.

Tack and block refer to film characteristics corresponding to the amount of adhesion between adjacent sheets and packaging machinery parts. A rating of 1 for blocking is excellent, 2 is good, while a 3 rating is only fair and 4 is poor.

Heat seal is determined by the force necessary to pull two-inch test strips of heat sealed coated films apart.

The data of the above table demonstrates the improved clarity of film coatings containing the particulate resin over clay-containing coatings, and that other film properties are not degraded in the practice of this invention.

Various changes and modifications may be made practicing the invention without departing from the spirit and scope thereof and, therefore, the invention is not to be limited except as defined in the appended claims.

I claim:

1. A composite film comprising a clear, non-fibrous organic base film, and a solvent laid coating on at least one side thereof comprising a major proportion of a resinous copolymer of from about 75 to less than 92% by weight of vinylidene chloride and at least one other monomer copolymerizable therewith, and from about 0.2 to about 2% based on the weight of the coating of solid particles having a size of from 0.1 to about 5 microns of a resinous copolymer of at least 92% and up to about 99% by weight of vinylidene chloride and at least one other monomer copolymerizable therewith.

2. The composite film of claim 1 wherein the base film is regenerated cellulose.

3. The composite film of claim 2 wherein the monomer copolymerizable with vinylidene chloride is acrylonitrile.

4. The composite film of claim 2 wherein the solid particles of the resinous copolymer are the dried residue of an emulsion polymerization reaction.

5. A method of preparing a coating composition for clear organic films comprising copolymerizing from about 92 to 99% by weight of vinylidene chloride and at least one other monomer copolymerizable therewith in an emulsion polymerization reaction, drying the reacted emulsion polymerization mixture, and introducing the dried residue of said emulsion polymerization comprising solid resin particles having a size of from 0.1 to about 5 microns into a coating lacquer which contains as the film-forming ingredient a copolymer of from about 75 to less than about 92% by weight of vinylidene chloride and at least one other monomer copolymerizable therewith, said residue incorporated into said lacquer in an amount of about 0.2 to 2% based on the weight of the coating composition.

6. The method of claim 5 wherein the emulsion polymerization mixture is dried in a spray drying technique.

7. The method of claim 5 wherein the dried residue of the emulsion polymerization is mixed with a non-solvent organic liquid and then introduced into the coating lacquer.

8. The method of claim 5 wherein the monomer copolymerizable with vinylidene chloride is acrylonitrile.

9. A coating composition comprising an organic solvent solution containing a dissolved resinous copolymer of from 75 to less than 92% by weight of vinylidene-chloride and at least one other monomer copolymerizable therewith, and from about 0.2 to about 2%, based on the weight of resin in said composition, of solid particles having a size of from 0.1 to about 5 microns of resinous copolymer of at least 92% and up to about 99% by weight of vinylidene-chloride and at least one other monomer copolymerizable therewith.

References Cited by the Examiner

UNITED STATES PATENTS 2,909,449  10/1959  Banigan _____ 260—899
3,144,425  8/1964   Koch et al. _____ 260—898

MURRAY TILLMAN, Primary Examiner.

J. WHITE, Assistant Examiner.